(12) United States Patent
Merrifield

(10) Patent No.: US 7,028,442 B2
(45) Date of Patent: Apr. 18, 2006

(54) DEPLOYABLE TRUSS BEAM WITH ORTHOGONALLY-HINGED FOLDING DIAGONALS

(76) Inventor: Donald V. Merrifield, 703 St. Francis Ave., Smyrna, TN (US) 37167

( * ) Notice: Subject to any disclaimer, the term of this patent is extended or adjusted under 35 U.S.C. 154(b) by 39 days.

(21) Appl. No.: 10/188,898

(22) Filed: Jul. 3, 2002

(65) Prior Publication Data

US 2003/0041548 A1    Mar. 6, 2003

Related U.S. Application Data

(60) Provisional application No. 60/302,997, filed on Jul. 3, 2001.

(51) Int. Cl.
*E04G 1/18* (2006.01)
*E04G 1/22* (2006.01)

(52) U.S. Cl. .................. 52/651.1; 52/646; 52/645; 52/632; 52/114

(58) Field of Classification Search .............. 52/646, 52/645, 121, 632, 109, 117, 118, 651.1; 244/158 R; 182/141
See application file for complete search history.

(56) References Cited

U.S. PATENT DOCUMENTS

| | | | | |
|---|---|---|---|---|
| 2,060,436 A | * | 11/1936 | Wetzel .................. 52/637 |
| 3,094,847 A | * | 6/1963 | Pogonowski ............. 405/204 |
| 3,220,152 A | * | 11/1965 | Sturm ................. 52/655.2 |
| 3,751,863 A | | 8/1973 | Lyons |
| 3,771,274 A | * | 11/1973 | Vaughan ................ 52/646 |
| 3,783,573 A | * | 1/1974 | Vaughan ................ 52/646 |
| 3,902,289 A | * | 9/1975 | Dashew ............... 52/126.7 |
| 4,259,821 A | * | 4/1981 | Bush ................. 52/309.1 |
| 4,334,391 A | | 6/1982 | Hedgepeth et al. |
| 4,337,560 A | * | 7/1982 | Slysh ................ 29/897.31 |
| 4,475,323 A | | 10/1984 | Schwartzberg et al. |
| 4,524,552 A | | 6/1985 | Hujsak |
| 4,539,786 A | * | 9/1985 | Nelson ................. 52/645 |
| 4,557,097 A | | 12/1985 | Mikulas, Jr. et al. |
| 4,569,176 A | * | 2/1986 | Hedgepeth et al. .......... 52/645 |
| 4,587,777 A | * | 5/1986 | Vasques et al. ............ 52/108 |
| 4,633,566 A | * | 1/1987 | Coppa ................. 29/429 |
| 4,646,994 A | * | 3/1987 | Petersen et al. ......... 244/158 R |
| 4,655,022 A | | 4/1987 | Natori |
| 4,662,130 A | | 5/1987 | Miura et al. |
| 4,667,451 A | * | 5/1987 | Onoda ................. 52/646 |
| 4,677,803 A | | 7/1987 | Mikulas, Jr. et al. |
| 4,679,961 A | * | 7/1987 | Stewart ................ 403/341 |
| 4,697,767 A | * | 10/1987 | Witten et al. ......... 244/158 R |
| 4,745,725 A | | 5/1988 | Onoda |
| 4,765,114 A | | 8/1988 | Wesselski |
| 4,771,585 A | | 9/1988 | Onoda et al. |
| 4,819,399 A | * | 4/1989 | Onoda ................. 52/646 |

(Continued)

FOREIGN PATENT DOCUMENTS

GB        2063959    *   6/1981   ............ 52/645

(Continued)

*Primary Examiner*—Phi Dieu Tran A
(74) *Attorney, Agent, or Firm*—Wayne Edward Ramage

(57) ABSTRACT

A deployable single truss with folding or removable chordal members and diagonals and orthogonal hinge joints for continuous and synchronous retraction and extension, in straight and curved configurations. One or more endframes may be used to close off or mount one of more ends of the deployable trusses. A primary orthogonal hinge joint is used to connect the chordal members and diagonals of the deployable trusses along each primary chord. A secondary orthogonal hinge joint to connect the chordal members and diagonals of the deployable trusses along each secondary chord.

21 Claims, 7 Drawing Sheets

U.S. PATENT DOCUMENTS

| | | |
|---|---|---|
| 4,829,739 A | 5/1989 | Coppa |
| 4,878,286 A * | 11/1989 | Coppa ........................ 29/467 |
| RE33,438 E * | 11/1990 | Stewart ...................... 403/341 |
| 5,016,418 A * | 5/1991 | Rhodes et al. ................ 52/646 |
| 5,040,349 A * | 8/1991 | Onoda et al. .................. 52/646 |
| 5,085,018 A | 2/1992 | Kitamura et al. |
| 5,154,027 A | 10/1992 | Warden |
| 5,163,262 A * | 11/1992 | Adams ........................ 52/646 |
| 5,184,444 A * | 2/1993 | Warden ....................... 52/646 |
| 5,267,424 A | 12/1993 | Douglas |
| 5,356,234 A * | 10/1994 | Vangool .................... 403/170 |
| 5,651,228 A | 7/1997 | Zeigler |
| 5,701,713 A | 12/1997 | Silver |
| 5,761,871 A | 6/1998 | Atake |
| 5,822,945 A | 10/1998 | Muller |
| 6,038,736 A * | 3/2000 | Nygren ........................ 16/275 |
| 6,076,770 A * | 6/2000 | Nygren et al. .......... 244/158 R |
| 6,082,056 A | 7/2000 | Hoberman |
| 6,158,187 A | 12/2000 | Nakajima |
| 6,161,359 A * | 12/2000 | Ono ........................ 52/651.1 |
| 6,321,501 B1 | 11/2001 | Ignash |
| 6,345,482 B1 | 2/2002 | Warren |
| 6,499,266 B1 * | 12/2002 | Macumber ................... 52/694 |

FOREIGN PATENT DOCUMENTS

| | | | |
|---|---|---|---|
| JP | 103573 | * 4/1991 | ................. 52/646 |

* cited by examiner

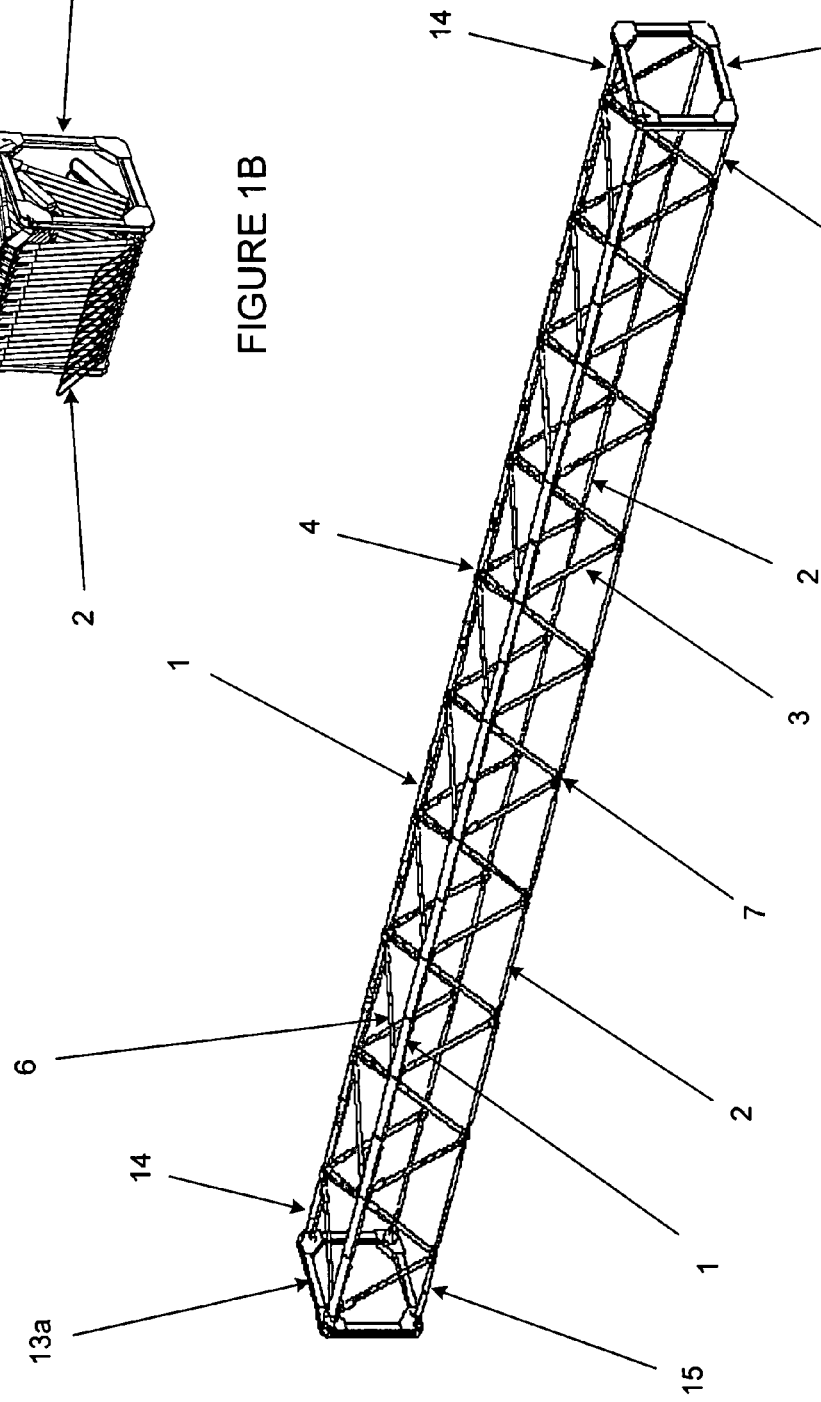
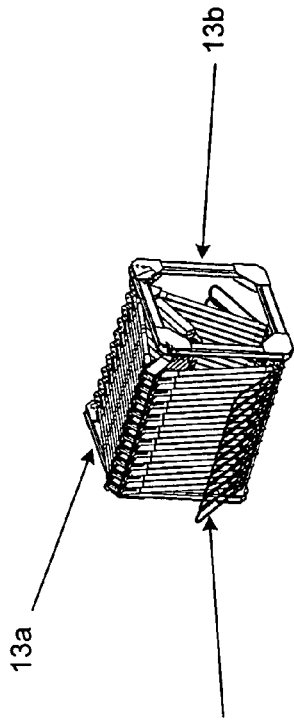
FIGURE 1A
FIGURE 1B

DEPLOYABLE TRUSS BEAM WITH ORTHOGONALLY-HINGED FOLDING DIAGONALS

Be it known that I, Donald V. Merrifield, a citizen of the United States, residing at 703 St. Francis Avenue, Smyrna, Tenn. 37167, have invented a new and useful "Deployable Truss Beam with Orthogonally-Hinged Folding Diagonals," which is the subject of Provisional Patent Application Ser. No. 60/302,997, filed Jul. 3, 2001, by Donald V. Merrifield, and is entitled to that filing date for priority.

BACKGROUND OF THE INVENTION

This invention relates generally to deployable truss beams, and more particularly to the apparatus and manner in which a three-dimensional, tetrahedron-based truss of square or rectangular section can be expanded and retracted in a continuous, stable, synchronous fashion in a variety of combinations and configurations to form a load-carrying beam or mast. Four longitudinal truss chords are formed by primary and secondary chord members, which can be formed by hinged, rigid, or flexible members. Chord members are connected by framesets comprised of truss diagonal members. Continuous, stable and synchronous motion while extending and retracting the truss is achieved by the use of uniquely incorporated orthogonal hinge joint fittings connecting the framesets and the chord members. The orthogonal hinge joint axes become orthogonal to each other at full extension of the truss and remain parallel at all times.

There have been many attempts to design, for various operating environments, a practical compact folding or flexing truss structure which can transition easily between the retracted and the useful extended state while exhibiting favorable characteristics of size/volume ratio, kinematic stability, simplicity and reliability, structural efficiency and weight, complexity, auxiliary mechanism requirements, manufacturing costs, speed of operation, and operating cost. Relatively few designs have appeared in the marketplace. Notable high-profile, and high-flying, examples are deployable trusses used in space missions such as for solar array deployment on NASA's International Space Station. Undesirable features of existing deployable trusses include complexity, inability to move in a coordinated and synchronous manner, requirements for a dedicated deployer and auxiliary mechanisms, and high cost.

Thus, what is needed is a deployable truss that achieves synchronous coordinated motion of all members while extending or retracting, is stable and self-forming and requires no dedicated auxiliary mechanisms and structures, and yet remains low in weight, complexity, and cost.

SUMMARY OF THE INVENTION

This invention relates to the apparatus and manner in which a three-dimensional, tetrahedron-based truss of square or rectangular section can be expanded and retracted in a stable, synchronous fashion in a variety of combinations and configurations to form a load-carrying beam or mast. The basic single truss comprises four longitudinal truss chords which are formed by primary and secondary chord members. These chord members can be either compression or tension members. Compression chord members may be hinged so they fold during retraction of the truss, or rigid members that are affixed to the truss after extension. Tension chord members may be flexible or hinged. Chord members are connected by framesets comprised of truss diagonal members. Continuous, stable and synchronous motion while extending and retracting the truss is achieved by the use of uniquely incorporated orthogonal hinge joint fittings connecting the framesets and the chord members. The orthogonal hinge joint axes become orthogonal to each other at full extension of the truss and remain parallel at all times. When fully deployed, the basic single truss forms three planar trusses, of Warren pattern, integrally joined along two common chords, with an open face between two secondary chords.

In the basic form, the invention can be used as a beam or a mast in a wide variety of applications. As a beam, it can be supported or mounted at each end, or cantilever mounted. As a mast, it is base-mounted with guy cables as required. End bearing pads may be affixed to the ends of the chordal members and end struts to provide additional stability and strength when the truss is deployed.

In an alternative embodiment of the basic single configuration, additional diagonals are added between the two secondary chords for additional strength and stability.

Another alternative embodiment of the invention is a dual rectangular configuration, where two single section trusses are connected along two secondary chords, providing greater strength and stability. Advantages include the ability to withstand transverse load reversal and, as a mast, no requirement for guy cables. In a variation on this embodiment, the side diagonals are removed from the long side of the dual rectangular configuration to reduce cost and weight.

A further alternative embodiment is a dual diamond configuration, where two single section trusses are connected along one secondary chord, with additional cross ties or members providing greater strength and stability.

Another embodiment is a curved configuration of the basic single truss and the dual rectangular truss configurations, where the chordal members are varied in length and the joints contain an angular offset so that the longitudinal axis of the truss follows a prescribed curve.

Thus, the invention in its various embodiments possesses several favorable characteristics relative to those trusses cited above, including, but not limited to, (i) use of the new orthogonal hinge folding method to achieve synchronous, coordinated motion of all members during extension or retraction, (ii) greater stability, (iii) self formation, so that no dedicated auxiliary mechanisms or structures are required other than simple means to offset gravity and friction, if required, (iv) deployment along the truss longitudinal axis with a length extension ratio that can be, but does not have to be, more than 15 times the retracted length, (v) minimization of cost, weight, and complexity by the elimination of unnecessary truss members and use of alternative forms of truss chordal members, and (vi) adaptability to actuation methods that can vary from fully manual to fully automatic, depending on the application requirements. Applications for the invention include, but are not limited to, scaffolding, platforms and construction equipment, crane and equipment booms, towers and masts, vehicle frames, theater stage roofs and lighting equipment, stowable equipment mounts, shelters, space structures and space vehicle booms, and exhibition display frames.

BRIEF DESCRIPTION OF THE DRAWINGS

FIGS. 1A and 1B show the general configuration of one exemplary embodiment of the basic single deployable truss beam in the retracted and extended (deployed) states and with principal components and features identified.

DESCRIPTION OF THE PREFERRED EMBODIMENTS

Figure 2C:
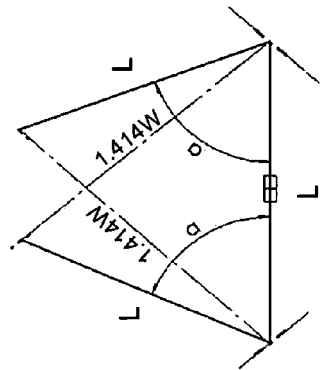
FIGS. 2A, 2B and 2C show the end views of single truss framesets in the extended and retracted states with frame and hinge axis layout geometry.

FIGS. 1A and 1B show the general configuration of a deployable single-section truss beam in the in the retracted and extended (deployed) states. Four longitudinal truss chords are formed by primary 1, and secondary 2 chordal members. As depicted in FIGS. 1A and 1B, the primary chordal members 1 are compression structures and the secondary chordal members 2 are tension structures, although the chordal members are not limited to this configuration. Compression chordal members may be rigid or hinged 1, while tension chordal members may be flexible, hinged or cables 2.

The primary chords 1 are laterally connected by base diagonal members 6. Each secondary chord 2 is laterally connected with the proximal primary chord 1 by side diagonal members 3. When deployed, as shown in FIG. 1A, the structure is equivalent to three planar trusses of Warren pattern with two common chords.

Primary orthogonal hinge joints 4 connect the ends of the primary chordal members that form the primary chords and the respective side 3 and base 6 diagonal members. Secondary orthogonal hinge joints 7 connect the ends of the secondary chordal members 2 that form the secondary chords and the respective side diagonal members 3.

One end of the truss is connected to a truss end frame 13a at a primary orthogonal hinge joint 4 and a secondary orthogonal hinge joint 7. For greater strength and stability, the truss may also be attached to the end frame at two additional points through the use of a primary strut 14 and a secondary strut 15. A second end frame 13b may be connected to the opposite end of the truss, as shown in FIG. 1A, but is not required.

Figure 2B:
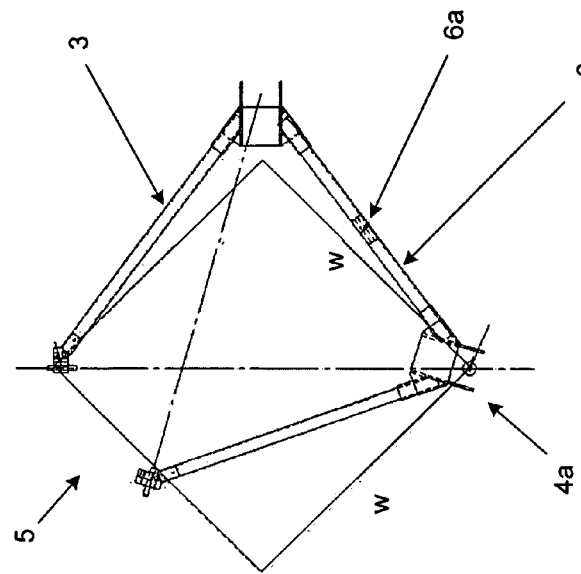
Figure 2A:
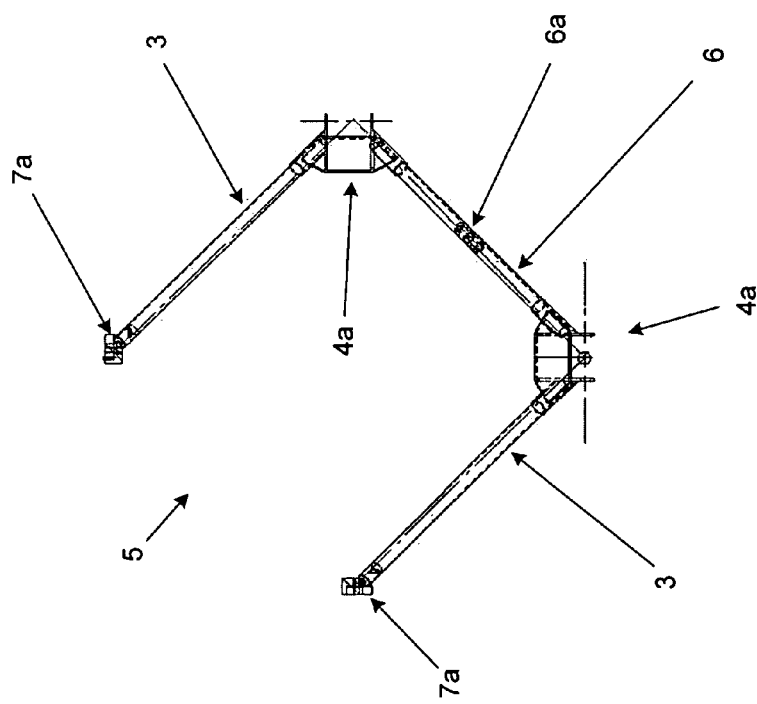

FIGS. 2A and 2B show the basic geometry of the diagonal members 3, 6 making up a truss frameset 5. A base diagonal member 6 connects at both ends to two side diagonal members 3 through two base joints 4a, which will ultimately form two primary orthogonal hinge joints 4. In a preferred embodiment, the base diagonal member 6 has a rotary joint 6a somewhere along its length, not necessarily at its center. The opposite ends of the side diagonal members 3 connect to other framesets and secondary chordal members through secondary orthogonal hinge joints 7a. The orthogonal hinge axes become orthogonal (90 degrees) to each other at full extension, and remain parallel at all times.

As shown in FIGS. 2B and 2C, the length between apexes of the frameset is the diagonal length "L" of the reference single truss having width "W." The side diagonals are also length "L" with angle "a" calculated from the reference single truss geometry. The lines opposite angles "a" are of length 1.414(W), equal to the truss diagonal. The primary orthogonal hinges 4 are at the corner apexes with their axes parallel to these lines. The secondary orthogonal hinges 7 are at the end of each side diagonal 3 with their axes parallel to the respective primary orthogonal hinge axes.

Figure 3A:
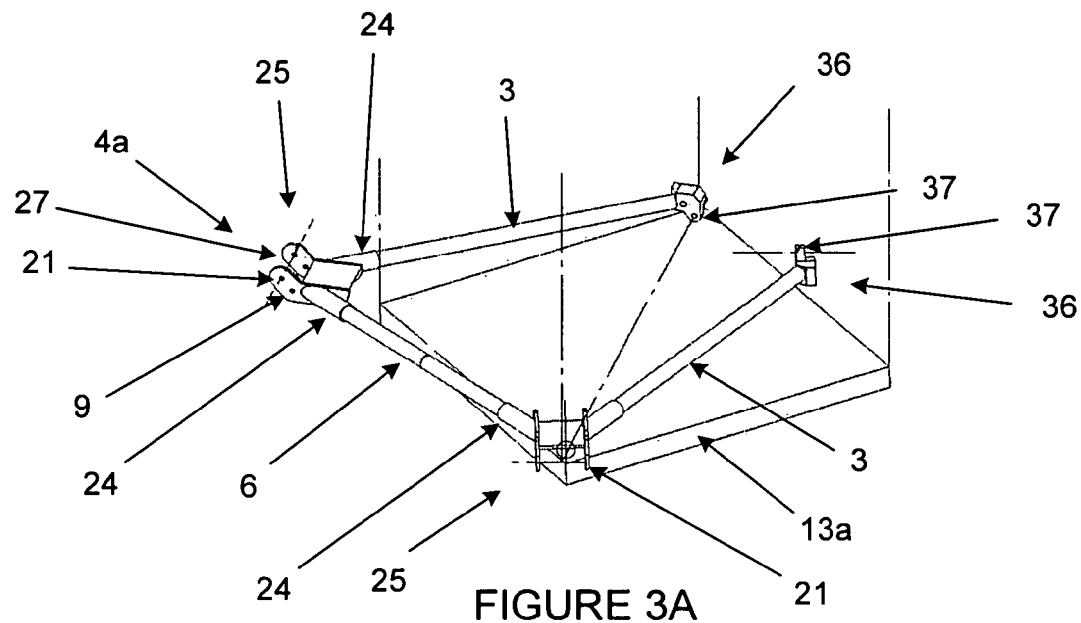
FIGS. 3A and 3B show the configuration of a single truss framebay in accordance with one exemplary embodiment of the present invention, and the method of mounting a major and minor joint of the truss to an end frame.
Figure 3B:
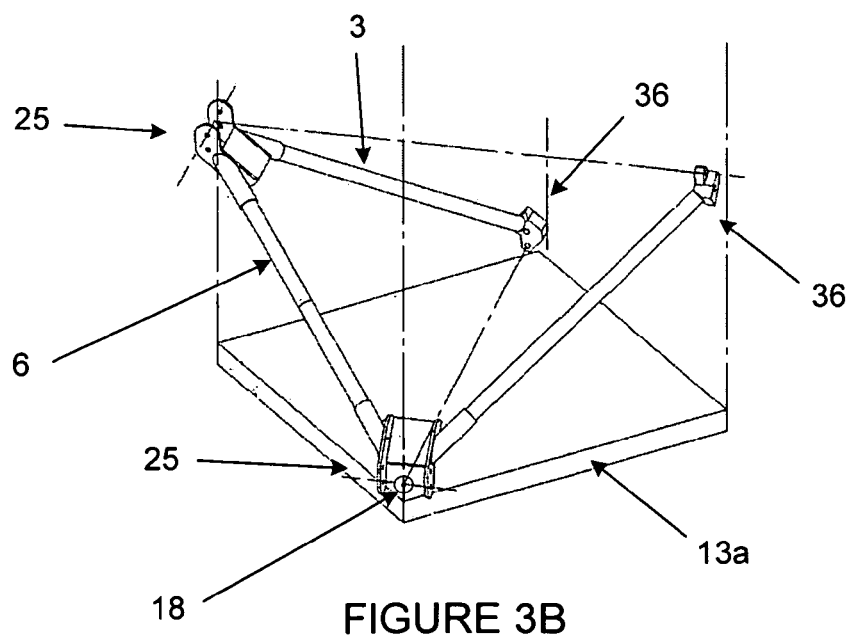
Figure 4A:
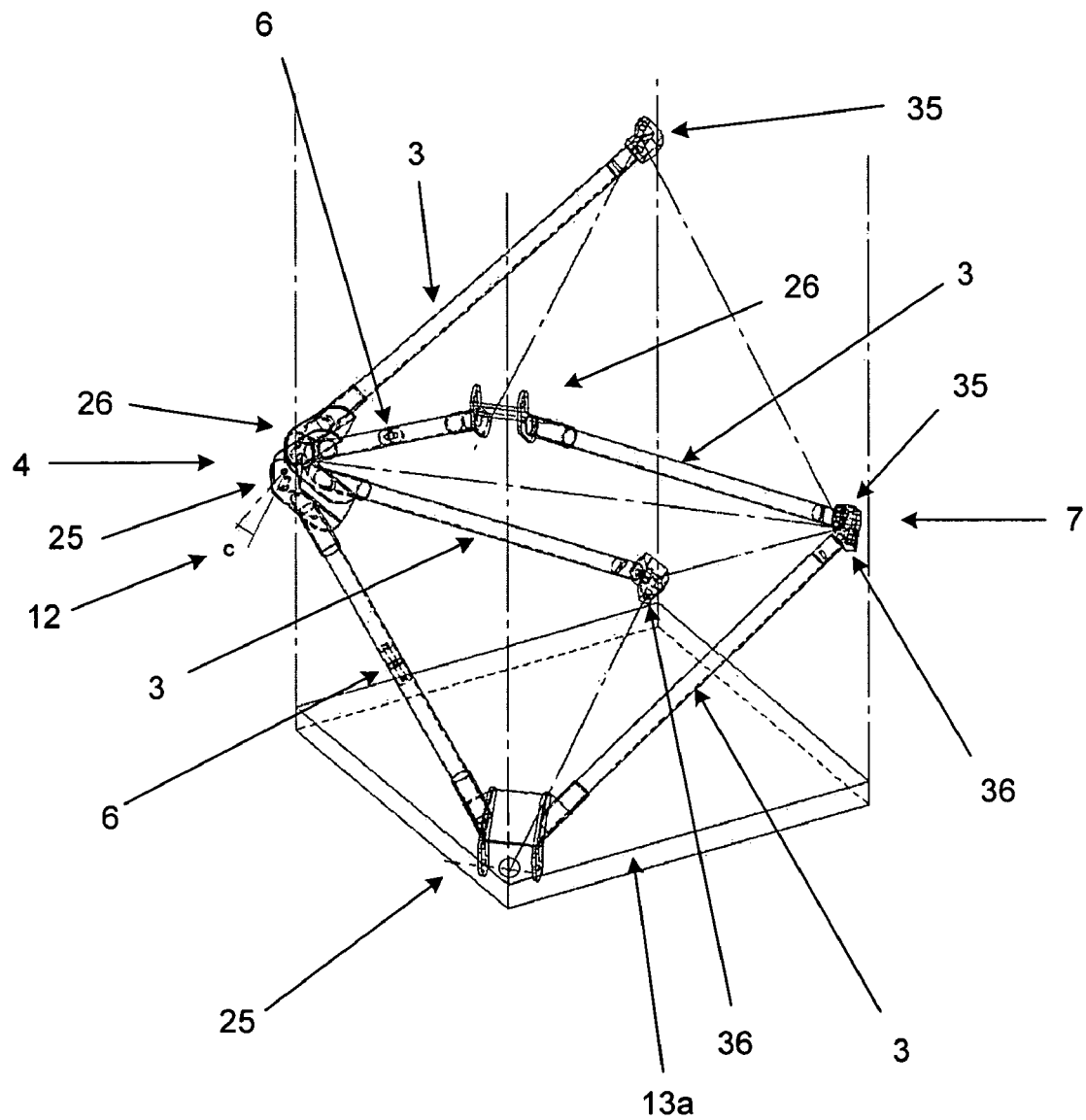
FIGS. 4A and 4B show the formation of a single truss framebay from two truss framesets and a primary and secondary chordal member in accordance with one exemplary embodiment of the present invention.
Figure 4B:
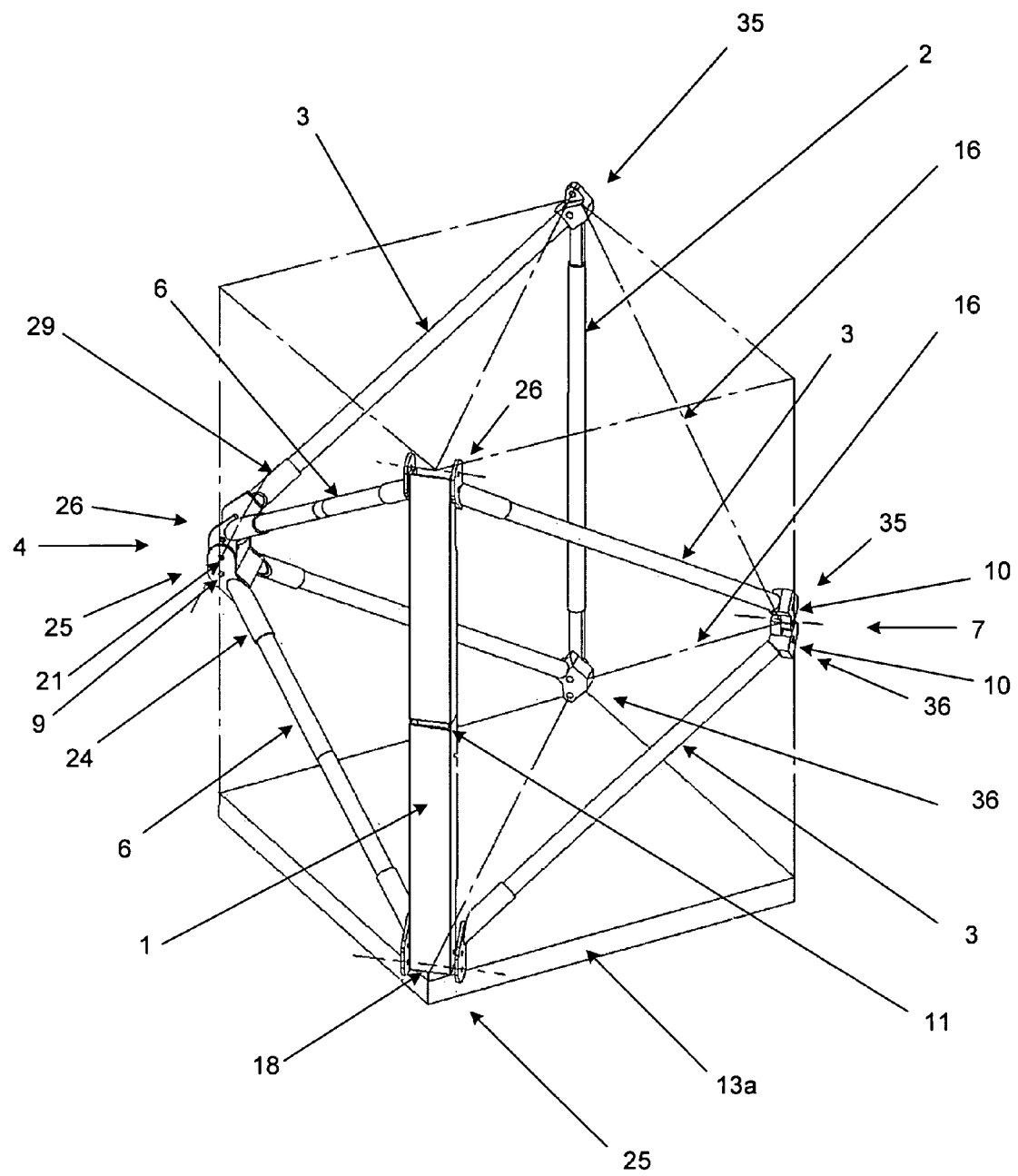

FIGS. 3A, 3B, 4A and 4B show how two framesets 5 are connected together to form a truss frameset subassembly and, with the addition of chordal members, a truss framebay 8. A frameset subassembly is formed by connecting two mirror-image framesets 5 at one of their respective base joints 4a to form a major joint 4, and at the free ends of their opposing side diagonals to form a minor joint 7. A primary chordal member 1 is connected to the two free base joints 4a on the framesets, and a second chordal member 2 is connected to the two free ends of the two side diagonals 3 connected to the major joint, to form a framebay 8. Mirror-imaged framebays then are connected in sequence at their respective major and minor joints. In the preferred embodiment, the major joints are primary orthogonal hinge joints 4 and the minor joints are secondary orthogonal hinge joints 7. As seen in FIG. 4B, orthogonal hinge axes are always parallel and become orthogonal at full extension.

Through the use of the orthogonal hinge joints 4, 7, the expansion and retraction kinematics are such that a driven rotation of any joint, e.g. a diagonal rotary joint, results in a predictable motion of all other joints including the chordal members 1, 2 if hinged, as, for example, in a conventional "scissor" linkage. Chordal members that are center-hinged 11 move in a "z-fold" manner and at full retraction are parallel-nested.

When retracted, each frameset, having one rotary joint 6a in the preferred embodiment, nests parallel to its mirror image, connected through one primary 4 and one secondary orthogonal 7 hinge joint, thus representing two layers of truss diagonals and one truss framebay 8 as seen in FIG. 4B. These two layers also contain the associated folding hinged chordal members 1 and the flexible chordal members 2 in the preferred embodiment.

The primary and secondary orthogonal hinge joints 4, 7 are each assembled from male and female halves to form the primary structural joints of the extended truss as shown in FIGS. 3A, 3B, 4A, 4B, 5A, 5B, 6A and 6B. The primary orthogonal hinge joints 4 have hinge pin connections 9 for the primary chordal members 1. The secondary orthogonal hinge joints 7 in FIG. 6A have connecting pins 10 for the secondary chordal members 2 shown in this embodiment.

FIGS. 5A, 5B, 6A, and 6B show side views of the primary 4 and secondary 7 orthogonal hinge joints and indicates their basic geometry. The primary orthogonal hinge joint 4 when retracted occupies "2P" (where "P" is the frame pitch) or the thickness of one bay, with the main hinge joint 21 axis centered and located in the hinge lugs 27, 28. Each half 25, 26 of the primary orthogonal hinge joint 4 receives two diagonals (one side 6 and one base 3), attached to the lugs 27, 28 (or equivalent part), as seen in FIGS. 2, 3 and 4. The diagonal mount angle is "a/2" degrees as seen in FIG. 2C. The lugs 27 also provide the hinge pin connections 9 for the primary chordal members 1, with axis location determined from angle "b" and distance "P", such that when extended (unfolded) the hinge pins are coplanar and lie on the chordal axis as shown in the "extended" view. The thickness available for the primary chordal members, if folded, is "P."

The secondary orthogonal hinge joints 7 receive and connect the side diagonals 3 as seen in FIG. 2A. The hinge axis is co-planar with the primary orthogonal hinge axis. The diagonal mount angle is "a/2" degrees as seen in FIG. 2C. As with the primary orthogonal hinge joints 4, the chordal member connection pin axes 10 as shown in FIG. 5A are located by angle "b" so that when unfolded the three hinge pins are coplanar and lie on the chordal axis.

Figure 5A:
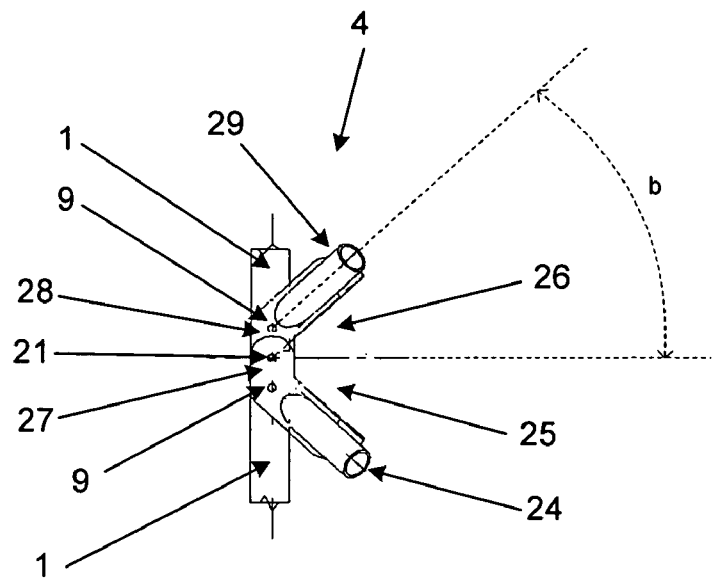
FIGS. 5A and 5B show views of the orthogonal hinge joint fittings and hinge fitting geometry of a primary orthogonal hinge joint.
Figure 5B:
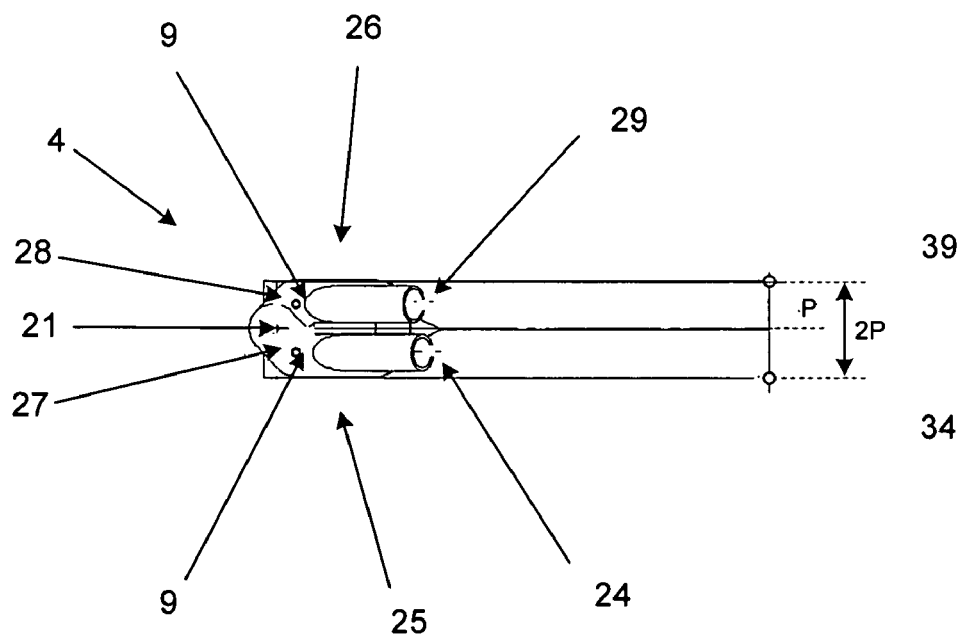

In one exemplary embodiment, as seen in FIGS. 5A and 5B, the primary orthogonal hinge joint 4 comprises a female half 25 with two ends, one end comprising two parallel lugs 27 with a sequence of matching holes 9, 21 in each lug for providing connecting points, and the other end comprising a pair of angled features 24 for connecting tubular, beam or rod structures, and a male half 26 with two ends, one end comprising two parallel lugs 28 with a sequence of matching holes 9, 21 in each lug, and the other end comprising a pair of angled features 29 for connecting tubular, beam or rod structures. The lugs 28 of the male half 26 are designed to fit within the two parallel lugs 27 of said female half 25 and be hingedly connected to said female half. As shown in FIGS. 5A and 5B, the hinge connection may comprise a main hinge pin inserted through a pair of matching holes 21 in the lugs 27, 28.

Figure 6A:
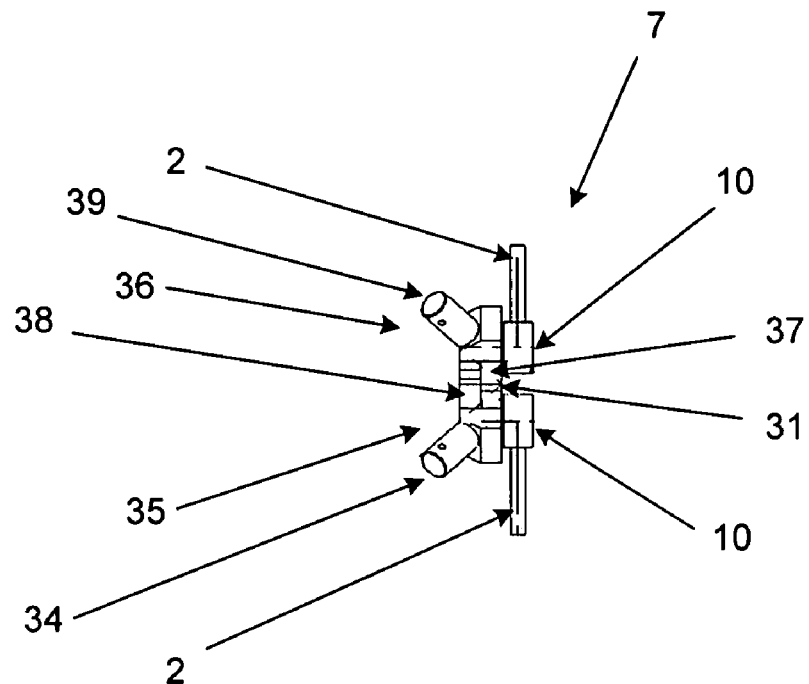
FIGS. 6A and 6B show views of the orthogonal hinge joint fittings and hinge fitting geometry of a secondary orthogonal hinge joint.
Figure 6B:
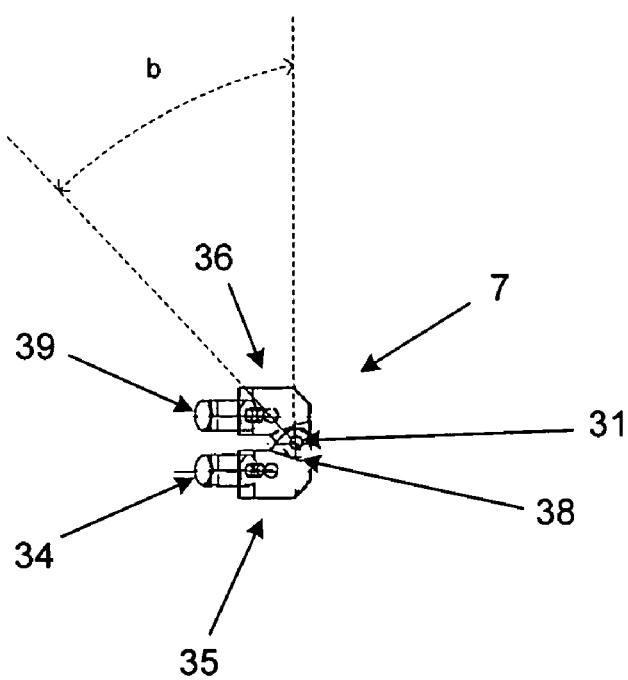

In another exemplary embodiment, as seen in FIGS. 6A and 6B, the secondary orthogonal hinge joint 7 comprises a female half 35 with two ends, one end comprising one offset 37 or two parallel lugs with a sequence of matching holes in each lug for providing connecting points, and the other end comprising a single angled feature 34 for connecting tubular, beam or rod structures, and a male half 36 with two ends, one end comprising a single lug 38 with a sequence of holes, and the other end comprising a single angled feature 39 for connecting tubular, beam or rod structures. In one embodiment, the lug 38 of the male half 36 is designed to fit within the two parallel lugs of said female half 35 and be hingedly connected to said female half. The hinge connection may comprise a main hinge pin inserted through a pair of matching holes 31 in the lugs. In an alternative embodiment, as shown in FIG. 6A, the female half 35 may have a single offset lug 37 designed to fit a matching offset lug 38 on the male half 36.

Kinematically, the truss requires a minimum of only one force or torque to cause continuous, synchronous motion (synchronous meaning all parts are kinematically coupled). Although hinged chordal members, when used, can lock passively (by springs or the equivalent), forces are required to cause unlocking and initial rotation of the "knee" joints 11 prior to retraction of the full assembly, as seen in FIG. 4B. For fully automatic or semi-automatic operation, this implies the need for actuators whose selection will be dependent on the specific requirements of a given truss application.

FIGS. 1, 3 and 4 depict the preferred method for connecting the truss ends to end mount frames 13a, 13b such that the truss chords are perpendicular to the end mount frames at full deployment, and parallel to the end mount frames when retracted. This is achieved by hinging the primary 4 and secondary 7 orthogonal hinge joints to the end mount frames 13a, 13b at diagonal corners as seen in FIG. 3A, and using short primary and secondary struts 14, 15 as seen in FIG. 1 to connect the other two diagonal corners. In the preferred embodiment, the primary strut 14 is similar to but about the half the length of the full-length primary chordal member 1, but the two halves of the strut are of unequal length in order to obtain the proper folding geometry. Alternatively, the primary strut 14 can be non-folding by having one end slide in a track on the respective end frame approximately parallel to the truss section diagonal line, with locking provision at full extension. As shown in FIG. 3B, one primary orthogonal hinge joint half requires a vertical axis pivot fitting 18 to accommodate the required rotation as seen in FIG. 2.

With reference to FIG. 4B, the open face of the truss can be fitted with diagonal members, including but not limited to telescoping or hinged diagonals, in an alternative embodiment (see two diagonal phantom lines 16 connecting the secondary orthogonal hinge joints 7). Another alternative embodiment relative to the truss chords is to manually install simple compression chordal members after the truss is unfolded. Use of compression chordal members for all four chords permits bi-directional beam moment loading, if needed. In a further embodiment, end bearing pads may be affixed to the ends of the chordal members and primary or secondary struts as appropriate, to provide additional stability and strength when the truss is deployed.

The basic single truss can be curved along the truss longitudinal axis. If it is desired that the truss longitudinal axis be curved rather than straight, the primary orthogonal hinge joints 4 can incorporate an in-plane castor angle 12, as seen in FIG. 4A, of a calculated magnitude "c" to create an angle between truss framebays, with the chordal member lengths adjusted to match.

For all embodiments, if gravity loading is not present or if the truss frames are supported by rollers or equivalent, a preferred method of deployment is application of an axial force at the end frame to both extend and retract. The chordal members, if hinged, are spring locked at full extension. To begin the retraction process, any hinged chordal members are unlocked and given an initial rotation as mentioned above. This is done either manually or by an actuation mechanism. The actuation components can be located on the chordal members or centrally located using pull cables.

For extension/retraction on a level or sloping surface, a preferred support method is the use of low-friction caster wheels attached to the primary orthogonal hinge joints to support the truss frames. When no support surface or floor is available, the truss can be supported by various simple cable/winch arrangements during extension and retraction. For long trusses, a vertical center hinge can be provided so that the two sections can be extended side-by-side until locked, then the end section rotated 180 degrees and locked.

Even though specific embodiments of this invention have been described, they are not to be taken as exhaustive. There are several variations that will be apparent to those skilled in the art, including multiple combinations of the basic single-section truss beyond the dual and curved configurations described herein.

I claim:

1. A deployable truss with proximal and distal ends, comprising:
   a. a plurality of framesets, each frameset having a base diagonal member and a first and second side diagonal members, said base and side diagonal members each having a first and second end, said first side diagonal member being rigidly connected at its first end adjacent to said first end of said base diagonal member at a first base joint, and the second side diagonal member being rigidly connected at its first end adjacent to said second end of said base diagonal member at a second base joint;
   b. a plurality of framebay subassemblies, each framebay subassembly comprising a first and second frameset connected to each other at a first major joint and a first minor joint, said first major joint comprising the connection of the first base joint of the first frameset to the first base joint of the second frameset, and said first minor joint comprising the connection of the second end of the second side diagonal of the first frameset to the second end of the second side diagonal of the second frameset; and c. a plurality of framebays, each framebay comprising a framebay subassembly, a first primary chord member connected at its ends to the second base joints of the first and second framesets comprising the framebay subassembly to form second and third major joints, and a first secondary chord member connected at its ends to the second ends of the first side diagonals of the first and second framesets comprising the framebay subassembly to form second and third minor joints, wherein adjacent framebays are connected directly to each other at their respective second and third major joints and at their respective second and third minor joints, and further wherein adjacent framebays are connected by means of a second primary chord member connected at its ends to the respective first major joints of said adjacent framebays and by means of a second secondary chord member connected at its ends to the respective first minor joints of said adjacent framebays;

d. further wherein said major joints comprise a female half and a male half, said female half comprising two ends, a first end comprising two parallel lugs with a sequence of one or more matching holes in each lug for providing a hinged connection to the male half, and a second end comprising a pair of angled connection features for connecting diagonal members, and said male half comprising two ends, a first end comprising two parallel lugs with a sequence of one or more matching holes in each lug for providing a hinged connection to the female half, and a second end comprising a pair of angled connection features for connecting diagonal members;

e. further wherein said minor joints comprise a female half and a male half, said female half comprising two ends, a first end comprising one or more lugs with a sequence of one or more matching holes in each lug for providing a hinged connection to the second half, and a second end comprising a single angled fitting for rigidly connecting a diagonal member, and said male half comprising two ends, a first end comprising one or more lugs with a sequence of one or more matching holes in each lug for providing a hinged connection to the female half, and a second end comprising a single angled fitting for rigidly connecting a diagonal member;

f. further wherein said truss, when extended, forms a U-shape in cross-section with a first, second, and third side, with a first primary chord and second primary chord formed by said primary chordal members extending through the two adjacent corners of the base of said U-shape, and with a first secondary chord and a second secondary chord formed by said secondary chordal members extending through the two ends of said U-shape, wherein the two primary chords are connected by a plurality of said base diagonal members to form the first side as the base of the U-shape, the first primary chord and the first secondary chord are connected by a plurality of said side diagonal members to form the second side, and the second primary chord and the second secondary chord are connected by a plurality of said side diagonal members to form the third side, further wherein there are no diagonal members, chordal members, or any other structural members connecting the first secondary chord and second secondary chord, and further wherein the first and second sides, and the first and third sides, meet at substantially ninety degree angles;

g. further wherein the side diagonal members of the second and third sides at all times during extension or retraction of the truss are rigidly connected to the respective angled connection features of the major joints such that no diagonal, chordal or other structural members extend between the diametrically opposing first primary chord and second secondary chord, or between the diametrically opposing second primary chord and second secondary chord.

2. A deployable truss with proximal and distal ends as in claim 1, further comprising
   a. an end frame connected to the framebay adjacent to one of said proximal and distal ends at one of the respective second or third major joints and one of said second or third minor joints of said framebay;
   b. a primary strut with two ends, connected at one end adjacent to said end frame and at the other end adjacent to the first major joint of the framebay adjacent to one of said proximal and distal ends; and
   c. a secondary strut with two ends, connected at one end adjacent to said end frame and at the other end adjacent to the first minor joint of the framebay adjacent to one of said proximal and distal ends.

3. A deployable truss with proximal and distal ends as in claim 2, further comprising:
   a. a second end frame connected to the framebay adjacent to the other of said proximal and distal ends at one of the respective second or third major joints and one of said second or third minor joints of said framebay;
   b. an additional primary strut with two ends, connected at one end adjacent to said second end frame and at the other end adjacent to the first major joint of the framebay adjacent to one of said proximal and distal ends; and
   c. an additional secondary strut with two ends, connected at one end adjacent to said second end frame and at the other end adjacent to the first minor joint of the framebay adjacent to one of said proximal and distal ends.

4. A deployable truss with proximal and distal ends as in claim 2 wherein the connection between a major joint and the respective end frame comprises a two-axis pivot fitting that permits rotational movement of the joint during deployment of the truss.

5. A deployable truss with proximal and distal ends as in claim 2, further wherein the end frame is connected to the framebay at the respective major joint by means of a two-axis fitting, and at the respective minor joint by means of a hinge fitting.

6. A deployable truss with proximal and distal ends as in claim 1, wherein said primary chord members further comprise a centrally-hinged folding member that locks at full extension of the truss, a fixed rigid member connected after full extension of the truss, or a structure adapted to provide compressive strength.

7. A deployable truss with proximal and distal ends as in claim 1, wherein said secondary chord members further comprise a centrally-hinged folding member that locks at full extension of the truss, a fixed rigid member connected after full extension of the truss, or a structure adapted to provide compressive strength.

8. A deployable truss with proximal and distal ends as in claim 1, wherein said primary chord members further comprise a flexible member, a centrally-hinged folding member, a cable, or a structure adapted to provide tensile strength.

9. A deployable truss with proximal and distal ends as in claim 1, wherein said secondary chord members further comprise a flexible member, a centrally-hinged folding member, a cable, or a structure adapted to provide tensile strength.

10. A deployable truss with proximal and distal ends as in claim 1, wherein said base diagonal members are adapted to be selectively rotated relative to their connections or are rotatably connected to said first and second major joints.

11. A deployable truss with proximal and distal ends as in claim 1, wherein said base diagonal members comprise two rigid portions rotatably connected.

12. A deployable truss with proximal and distal ends as in claim 1, wherein respective framesets are adapted to collapse and expand in a coordinated, synchronous manner through action of the major and minor joints wherein the axis of the hinge connections of said major and minor joints remain orthogonal to the truss longitudinal axis.

13. A deployable truss with proximal and distal ends as in claim 1, further wherein the two parallel lugs of the male half of a major joint are designed to fit with the two parallel lugs of the female half of said major joint, and the male half is hingedly connected to the female half by a main hinge pin inserted through matching holes in the lugs.

14. A deployable truss with proximal and distal ends as in claim 1, wherein the means for connecting the male or female half of a major joint to one end of a primary chord member comprises a hinge pin inserted through one or more holes in the end of the primary chord member and a pair of matching holes in the lugs of the respective half of the major joint.

15. A deployable truss with proximal and distal ends as in claim 1, further wherein the axes of the hinge connections between the halves of said major and minor joints are orthogonal to each other when the truss is at full extension.

16. A deployable truss with proximal and distal ends as in claim 1, further wherein the axis of the hinge connection between the halves of each major joint are co-planar and parallel with the axes of the hinge connections between each half of said major joint and the respective primary chord members when the truss is at full extension.

17. A deployable truss with proximal and distal ends as in claim 1, further wherein the corresponding diagonal members of adjacent framesets nest parallel and adjacent to each other when the truss is fully collapsed.

18. A deployable truss with proximal and distal ends as in claim 17, further wherein the corresponding chord members of adjacent framesets nest parallel and adjacent to each other and in the same transverse space as the diagonal members when the truss is fully collapsed.

19. A deployable truss with proximal and distal ends as in claim 1, further wherein the second end of each major joint half has a space between its angled connection features to permit parallel nesting of a primary chord member when the truss is collapsed.

20. A deployable truss with proximal and distal ends as in claim 1, wherein the male and female halves of said major joints each comprise means for connecting to one end of a primary chord member, and the male and female halves of said minor joints each comprise means for connecting to one end of a secondary chord member.

21. A deployable truss with proximal and distal ends as in claim 1, further wherein the angled connection features of the second end of the female half of said major joints are co-planar, and the angled connection features of the second end of the male half of said major joints are co-planar.

* * * * *